United States Patent Office.

LOUIS WOLFF, OF CHICAGO, ILLINOIS.

Letters Patent No. 101,340, dated March 29, 1870.

IMPROVED LINIMENT FOR BURNS, SCALDS, &c.

The Schedule referred to in these Letters Patent and making part of the same.

*To all whom it may concern:*

Be it known that I, LOUIS WOLFF, of the city of Chicago, in the county of Cook and State of Illinois, have invented certain new and useful Improvements in "Liniment for Burns and Scalds;" and I do hereby declare that the following is a full, clear, and exact description thereof, reference being had to the accompanying drawings making part of this specification, and to the letters of reference marked thereon, like letters indicating like parts wherever they occur.

To enable others skilled in the art to construct and use my invention, I will proceed to describe it.

The object of my invention is to prepare inexpensive and highly useful liniment, to be used for burns and scalds, and its nature consists in the following:

I take linseed-oil, rendered beef-suet, powdered rosin, and yellow bees-wax in the following proportions, viz:

To one pint of linseed-oil I take six ounces of rendered beef-suet, three and a half ounces of powdered rosin, and two and a half ounces of yellow bees-wax. Put the ingredients all together in a kettle and boil, stirring the contents, and, when the ingredients become melted and intimately mixed, I pour the liniment out of the kettle into boxes, cans, or other suitable vessels, and let it cool.

The liniment is used in the ordinary manner, and is exceedingly effective for burns and scalds.

What I claim as new, and desire to secure by Letters Patent, is—

The liniment for burns and scalds, made of the ingredients herein specified and prepared, substantially as and in the manner set forth.

LOUIS WOLFF.

Witnesses:
J. B. TURCHIN,
JOHN McINTOSH.